United States Patent
Kadlec et al.

(10) Patent No.: US 12,263,545 B2
(45) Date of Patent: Apr. 1, 2025

(54) WELDING-TYPE POWER SUPPLIES WITH ADJUSTABLE AC CURRENT COMMUTATION THRESHOLDS

(71) Applicant: Illinois Tool Works Inc., Glenview, IL (US)

(72) Inventors: Mark S. Kadlec, Shiocton, WI (US); Andrew Joseph Henry, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 679 days.

(21) Appl. No.: 15/670,168

(22) Filed: Aug. 7, 2017

(65) Prior Publication Data

US 2018/0050412 A1    Feb. 22, 2018

Related U.S. Application Data

(60) Provisional application No. 62/375,830, filed on Aug. 16, 2016.

(51) Int. Cl.
   *B23K 9/10*     (2006.01)
   *B23K 9/067*    (2006.01)
   (Continued)

(52) U.S. Cl.
   CPC ............ *B23K 9/1043* (2013.01); *B23K 9/067* (2013.01); *B23K 9/0731* (2013.01); *B23K 9/092* (2013.01);
   (Continued)

(58) Field of Classification Search
   CPC ...... B23K 9/067; B23K 9/0731; B23K 9/092; B23K 9/0953; B23K 9/0956; B23K 9/1006; B23K 9/1043
   See application file for complete search history.

(56) References Cited

U.S. PATENT DOCUMENTS

| 2,013,068 | A |   | 9/1935 | Schenk |
| 6,111,216 | A | * | 8/2000 | Stava ..................... B23K 9/091 219/130.51 |

(Continued)

FOREIGN PATENT DOCUMENTS

| CN | 1261016 | 7/2000 |
| CN | 101687268 | 3/2010 |

(Continued)

OTHER PUBLICATIONS

Int'l Search Report and Written Opinion for Appln No. PCT/US2017/045920 dated Apr. 6, 2018 (34 pgs).

*Primary Examiner* — Sang Y Paik
(74) *Attorney, Agent, or Firm* — McAndrews, Held & Malloy, Ltd.

(57) ABSTRACT

Welding-type power supplies with adjustable AC current commutation thresholds are disclosed. An example welding-type power supply includes an interface device to receive a commutation selection input, a power converter to convert input power to welding-type power, a commutator circuit to output alternating current (AC) welding-type power and to control a polarity of the AC welding-type power, and a control circuit. The control circuit determines a threshold output current based on the commutation selection input, determines an output current and a polarity of the AC welding-type power and, when the output current is less than the threshold output current, controls the commutator circuit to change the polarity of the AC welding-type power.

5 Claims, 3 Drawing Sheets

(51) Int. Cl.
*B23K 9/073* (2006.01)
*B23K 9/09* (2006.01)
*B23K 9/095* (2006.01)

(52) U.S. Cl.
CPC .......... *B23K 9/0953* (2013.01); *B23K 9/0956* (2013.01); *B23K 9/1006* (2013.01)

(56) References Cited

U.S. PATENT DOCUMENTS

| | | | | |
|---|---|---|---|---|
| 7,781,700 | B2* | 8/2010 | Harris | B23K 9/1062 |
| | | | | 219/130.5 |
| 9,259,796 | B2 | 2/2016 | Peters et al. | |
| 2008/0156781 | A1* | 7/2008 | Artelsmair | B23K 9/092 |
| | | | | 219/130.5 |
| 2013/0068744 | A1 | 3/2013 | Matsui et al. | |
| 2013/0228558 | A1* | 9/2013 | Daniel | B23K 9/025 |
| | | | | 219/130.21 |
| 2014/0263237 | A1* | 9/2014 | Daniel | B23K 9/1043 |
| | | | | 219/130.21 |

FOREIGN PATENT DOCUMENTS

| | | | | |
|---|---|---|---|---|
| CN | 102470473 | | 5/2012 | |
| CN | 103586563 | | 2/2014 | |
| CN | 103878465 | | 6/2014 | |
| CN | 104722885 | | 6/2015 | |
| CN | 104768694 | | 7/2015 | |
| CN | 105026088 | | 11/2015 | |
| EP | 0538227 | | 4/1993 | |
| EP | 0538227 A1 * | | 4/1993 | .......... B23K 9/1006 |
| EP | 1193019 A2 | | 4/2002 | |
| EP | 1193019 A3 | | 4/2002 | |
| SU | 563241 | | 6/1977 | |
| WO | 2011114679 | | 9/2011 | |

* cited by examiner

WELDING-TYPE POWER SUPPLIES WITH ADJUSTABLE AC CURRENT COMMUTATION THRESHOLDS

RELATED APPLICATIONS

This patent claims priority to U.S. Provisional Patent Application Ser. No. 62/375,830, filed Aug. 16, 2016, and entitled "Welding-Type Power Supplies with Adjustable AC Current Commutation Thresholds." The entirety of U.S. Provisional Patent Application Ser. No. 62/375,830 is incorporated herein by reference.

BACKGROUND

This disclosure relates generally to alternating current welding-type systems and, more particularly, to welding-type power supplies with adjustable AC current commutation thresholds.

SUMMARY

Methods and systems are provided for welding-type power supplies with adjustable AC current commutation thresholds, substantially as illustrated by and described in connection with at least one of the figures, as set forth more completely in the claims.

BRIEF DESCRIPTION OF THE DRAWINGS

The figures are not to scale. Where appropriate, the same or similar reference numerals are used in the figures to refer to similar or identical elements.

DETAILED DESCRIPTION

Figure 1:
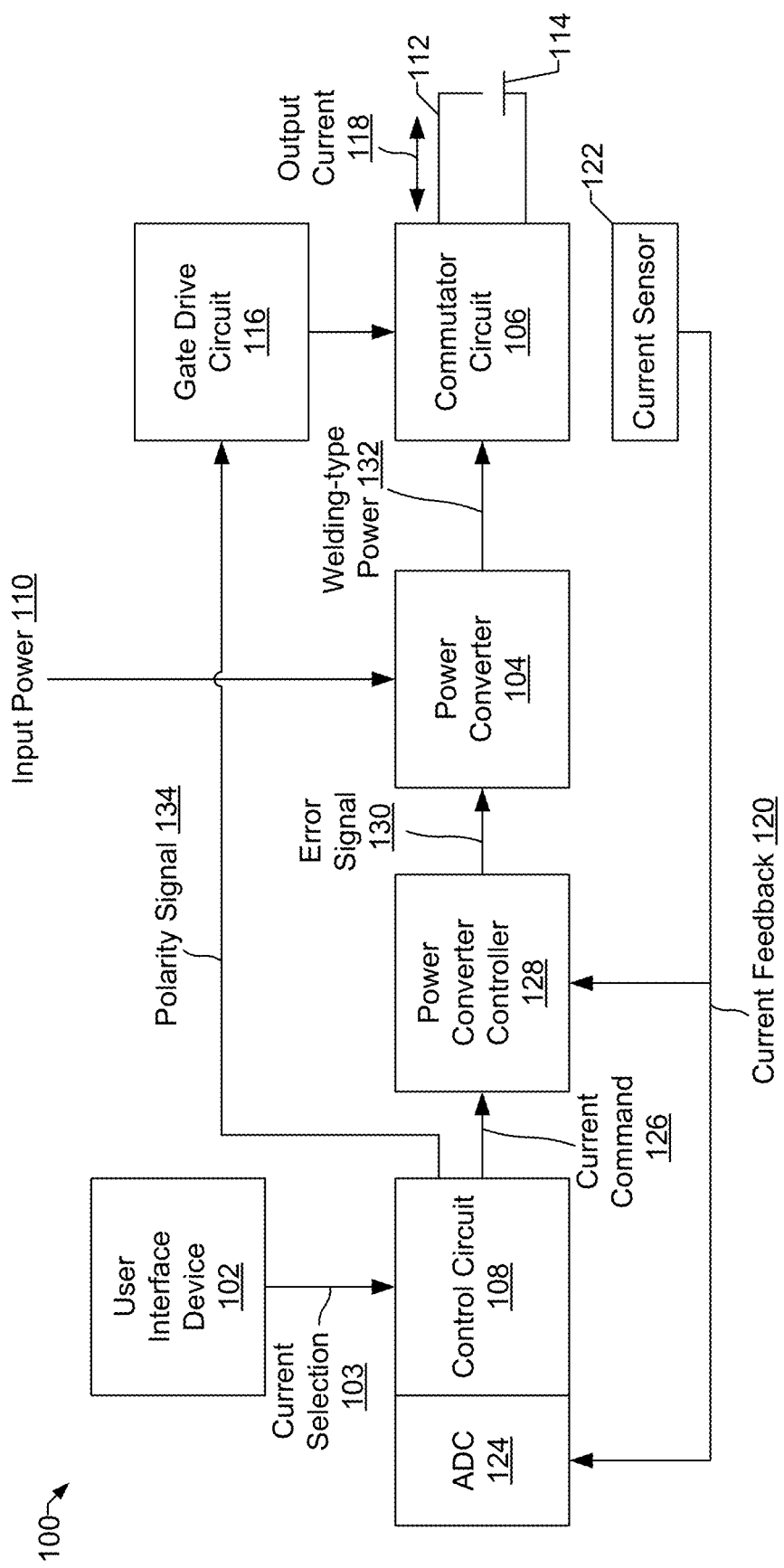
FIG. 1 shows an exemplary welding-type system having adjustable current commutation thresholds in accordance with aspects of this disclosure.

Conventional AC welding systems have a preset current commutation level that is tuned by the manufacturer based on the output current selected by the user.

In contrast to conventional AC welding systems, disclosed example welding-type power supplies enable input of a current commutation threshold to the welding-type power supply to control the current commutation timing. Disclosed examples further enable selection of the current commutation threshold independently from selection of the output current. provide the advantage of changing it to make the arc softer (less noise and intense) or more intense and driving as it is today.

Disclosed examples improve welding-type operations by enabling a softer arc with less puddle agitation in AC applications. Disclosed examples also provide improved wetting action of a weld puddle, less audible noise, and/or improved directional control of a welding arc.

Disclosed examples include an AC welding-type power source that includes control of the commutation current of the AC waveform used for control of the output power. The control of the commutation current enables changing the dynamics of a welding arc in any type of waveform chosen for control. Disclosed examples provide the operator with flexibility to control the arc independent of what output current peak is used. In some examples, the current commutation control is within a set range or an unlimited range, and/or may be tied to other variables of control on the power source such as AC frequency, current amplitude, AC current balance, an AC waveform shape, an AC pulse modulation waveform and/or any other variables.

Disclosed example welding-type power supplies include an interface device, a power converter, a commutator circuit, and a control circuit. The interface device receives a commutation selection input. The power converter converts input power to welding-type power. The commutator circuit outputs alternating current (AC) welding-type power and controls a polarity of the AC welding-type power. The control circuit determines a threshold output current based on the commutation selection input, determines an output current and the polarity of the AC welding-type power and, when the output current is less than the threshold output current, controls the commutator circuit to change the polarity of the AC welding-type power.

In some example power supplies, the control circuit determines the threshold output current based on multiplying the commutation selection input by a ratio between a positive peak current and a negative peak current of the AC welding-type power. In some examples, the commutation selection input includes a percentage of a peak current, and the control circuit is configured to determine the threshold output current based on multiplying the commutation selection input by a positive peak current setpoint or a negative peak current setpoint. In some examples, the control circuit controls a voltage level or a current level used by the power converter to output the welding-type power based on a waveform. In some examples, the commutation selection input is selectable between a first discrete commutation threshold and a second discrete commutation threshold, in which the first and second discrete commutation thresholds correspond to different arc characteristics. In some examples, the commutation selection input is selectable along a substantially continuous range of commutation threshold values.

In some example power supplies, the control circuit sets the threshold output current equal to a value received via the commutation selection input. In some examples, the threshold output current is a same value for a positive current or a negative current with respect to a reference current. In some examples, the threshold output current is a different value for a positive current or a negative current with respect to a reference current. In some examples, the control circuit determines the threshold output current based on at least one of an AC frequency, a current amplitude, an AC current balance, an AC waveform shape, or an AC pulse modulation waveform.

Disclosed example non-transitory machine readable storage devices include or store machine readable instructions which, when executed, cause a control circuit to control a commutator circuit to control a polarity of welding-type power from a power converter to output alternating current (AC), determine a threshold output current based on a commutation selection input from a user interface, determine an output current and a polarity of the AC welding-type power and, when the output current is less than the threshold output current, control the commutator circuit to change the polarity of the AC welding-type power.

In some examples, the instructions cause the control circuit to determine the threshold output current based on at least one of an AC frequency, a current amplitude, an AC current balance, an AC waveform shape, or an AC pulse modulation waveform. In some examples, the instructions cause the control circuit to determine the threshold output current based on multiplying the commutation selection input by a ratio between a positive peak current and a negative peak current of the AC welding-type power. In some examples, the commutation selection input includes a percentage of a peak current, and the control circuit is configured to determine the threshold output current based on multiplying the commutation selection input by a positive peak current setpoint or a negative peak current setpoint. In some examples, the commutation selection input is selectable between a first discrete commutation threshold and a second discrete commutation threshold, in which the first and second discrete commutation thresholds correspond to different arc characteristics.

In some examples, the threshold output current is a same value for a positive current or a negative current with respect to a reference current. In some examples, the threshold output current is different for a positive current or a negative current with respect to a reference current. In some examples, the instructions cause the control circuit to set the threshold output current equal to a value received via the commutation selection input. In some examples, the commutation selection input is selectable along a substantially continuous range of commutation threshold values.

Disclosed example welding-type power supplies include an interface device, a power converter, a commutator circuit, and a control circuit. The interface device receives an alternating current (AC) control variable. The power converter converts input power to welding-type power. The commutator circuit outputs alternating current (AC) welding-type power and controls a polarity of the AC welding-type power. The control circuit determines a threshold output current based on the AC control variable received via the interface device, determines an output current and the polarity of the AC welding-type power and, when the output current is less than the threshold output current, controls the commutator circuit to change the polarity of the AC welding-type power.

In some example power supplies, the AC control variable includes at least one of an AC frequency, a current amplitude, an AC current balance, an AC waveform shape, or a AC pulse modulation waveform. In some examples, the threshold output current is a different value for a positive current or a negative current with respect to a reference current. In some examples, the threshold output current is a same value for a positive current or a negative current with respect to a reference current.

Welding-type power, as used herein, refers to power suitable for welding, plasma cutting, induction heating, air carbon-arc cutting and/or gouging (CAC-A), cladding, and/or hot wire welding/preheating (including laser welding and laser cladding).

Welding-type system, as used herein, includes any device capable of supplying welding-type power, including inverters, converters, choppers, resonant power supplies, quasi-resonant power supplies, etc., as well as control circuitry and other ancillary circuitry associated therewith.

As used herein, "less than" refers to "closer to 0" when used with reference to voltages or currents and when the voltages/currents being compared have the same polarity. For example, 2 amps of current is less current than 3 amps, and −2 amps is less current than −3 amps.

FIG. 1 shows an exemplary welding-type system 100 having adjustable current commutation thresholds. As described below, the example system 100 of FIG. 1 enables improved control of an AC welding-type arc compared to conventional welding power supplies.

The system 100 includes a user interface device 102, a power converter 104, a commutator circuit 106, and a control circuit 108. The system 100 receives input power 110 and provides welding-type AC power to a welding-type torch 112 to perform an AC welding-type operation on a workpiece 114.

The example user interface device 102 receives a current selection 103 as an input. In some examples, the current selection input is a positive current commutation threshold for a positive polarity, a negative current commutation threshold for a negative polarity, and/or a current selection from which the positive and/or negative current commutation threshold(s) are derived.

The power converter 104 converts input power 110 to AC welding-type power. For example, the power converter 104 may be a switched mode power supply or any other type of power supply.

The commutator circuit 106 controls the polarity of the AC welding-type power to the welding-type torch 112 and the workpiece 114. For example, the commutator circuit 106 may include a bridge of four insulated gate bipolar transistors (IGBTs) that are controlled by a gate drive circuit 116 to switch the polarity of the output power between positive current (e.g., electrode positive) and negative current (e.g., electrode negative). The gate drive circuit 116 is controlled by the control circuit 108.

The control circuit 108 determines positive and negative commutation threshold currents based on the current selection input from the user interface device 102. The control circuit 108 determines an output current 118 and a polarity of the AC welding-type power based on current feedback 120 from a current sensor 122. The example current sensor 122 may be, for example, a current transformer electrically and/or magnetically coupled to the output of the commutator circuit 106 and/or the torch 112 (e.g., an electrode), which can measure the amplitude and/or polarity of the output current 118. An analog-to-digital converter (ADC) circuit 124 converts the current feedback 120 to a digital representation for input to the control circuit 108.

The control circuit 108 controls the current amplitude via a current command 126 to a power converter controller 128. The control circuit 108 may control a voltage level and/or a current level used by the power converter 104 to output welding-type power based on the feedback 120. In some examples, the control circuit 108 controls the voltage level or the current level based on a waveform The power converter controller 128 may be, for example, a comparator that compares the current command 126 (e.g., a desired output current) to the current feedback 120 (e.g., the measured output current) to generate an error signal 130. The error signal 130 controls the power converter 104 to increase or decrease the output voltage and/or current (e.g., welding-type power 132) output to the commutator circuit 106.

The control circuit 108 compares the output current to the threshold output current (e.g., the positive or negative commutation current, based on the polarity). When the output current is less than the threshold output current, the control circuit 108 controls the commutator circuit 106 to change the polarity of the output current 118. In the example of FIG. 1, the control circuit 108 outputs a polarity signal 134 to the gate drive circuit 116, which causes the gate drive circuit 116 to control the commutator circuit 106 to set or switch an output polarity of the output current 118.

The current command 126 and/or the polarity signal 134 may be analog or digital output signals. In some examples, the control circuit 108 determines the current command 126 and/or the polarity signal 134 as digital signals, which are then converted to analog signals at the output by the control circuit 108 by a digital-to-analog converter (DAC) circuit.

Figure 2:
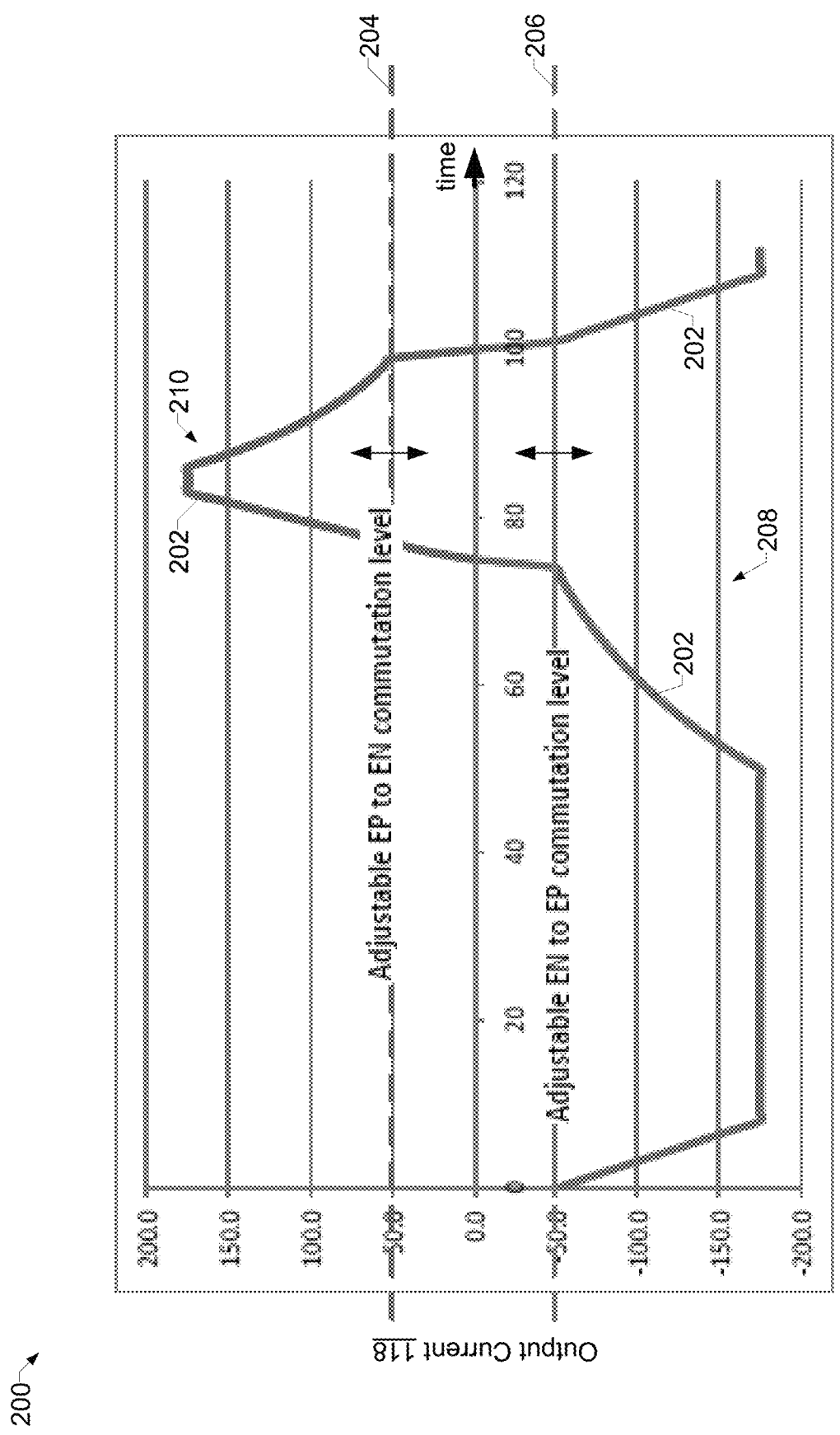
FIG. 2 is a graph illustrating an example output alternating current waveform output by the example welding-type system of FIG. 1, in accordance with aspects of this disclosure.

FIG. 2 is a graph 200 illustrating an example AC waveform 202 output by the example welding-type system 100 of FIG. 1. The example AC current waveform 202 represents the output current 118 over time for the AC current waveform 202. The graph 200 also illustrates an example positive current commutation threshold 204 and an example negative current commutation threshold 206.

During a negative polarity portion 208 of the waveform 202, the control circuit 108 monitors the current feedback 120 from the current sensor 122. When the control circuit 108 determines that the output current 118 is less than the negative current commutation threshold 206, the control circuit 108 controls the gate drive circuit 116, via the polarity signal 134, to switch the polarity of the output current 118 to a positive polarity.

Similarly, during a positive polarity portion 210 of the waveform 202, the control circuit 108 monitors the current feedback 120. When the control circuit 108 determines that the output current is less than the positive current commutation threshold 204, the control circuit 108 controls the gate drive circuit 116, via the polarity signal 134, to switch the polarity of the output current 118 to a negative polarity.

While the thresholds 204, 206 of FIG. 2 are equal with opposite polarities, in other examples the thresholds 204, 206 are independently selectable by the user or programmatically determined based on the input and/or one or more other control variables. Example control variables include the AC frequency, the current amplitude, an AC current balance an AC waveform shape, and/or an AC pulse modulation waveform. In still other examples, one or both of the thresholds 204, 206 may be adjusted based on a ratio enforced between the thresholds 204, 206. For example, if the threshold 204 is set to a first current, the threshold 206 is set by applying a factor to the threshold 204. The factor may be automatically determined and/or input via the user interface device 102. For example, the thresholds 204, 206 may be determined based on a selection of one of the thresholds 204, 206 and calculating the other of the thresholds 204, 206 based on the input threshold and a ratio between the positive and negative peak currents. In some examples, the user is able to select between discrete levels of the current commutation thresholds 204, 206 to achieve harder or softer arc characteristics. Additionally or alternatively, the user can select the thresholds 204, 206 from a substantially continuous range of values A substantially continuous range of values may be implemented using relatively small incremental steps in the thresholds 204, 206, such as 0.1 A, 0.5 A, 1 A, 2 A, 5 A, 10 A, or any other increment, in response to an input such as pushing a button and/or turning a dial on the user interface device 102, receiving a communication from a remote control device, and/or receiving any other wired or wireless communication including a change in the commutation threshold(s) 204, 206.

Figure 3:
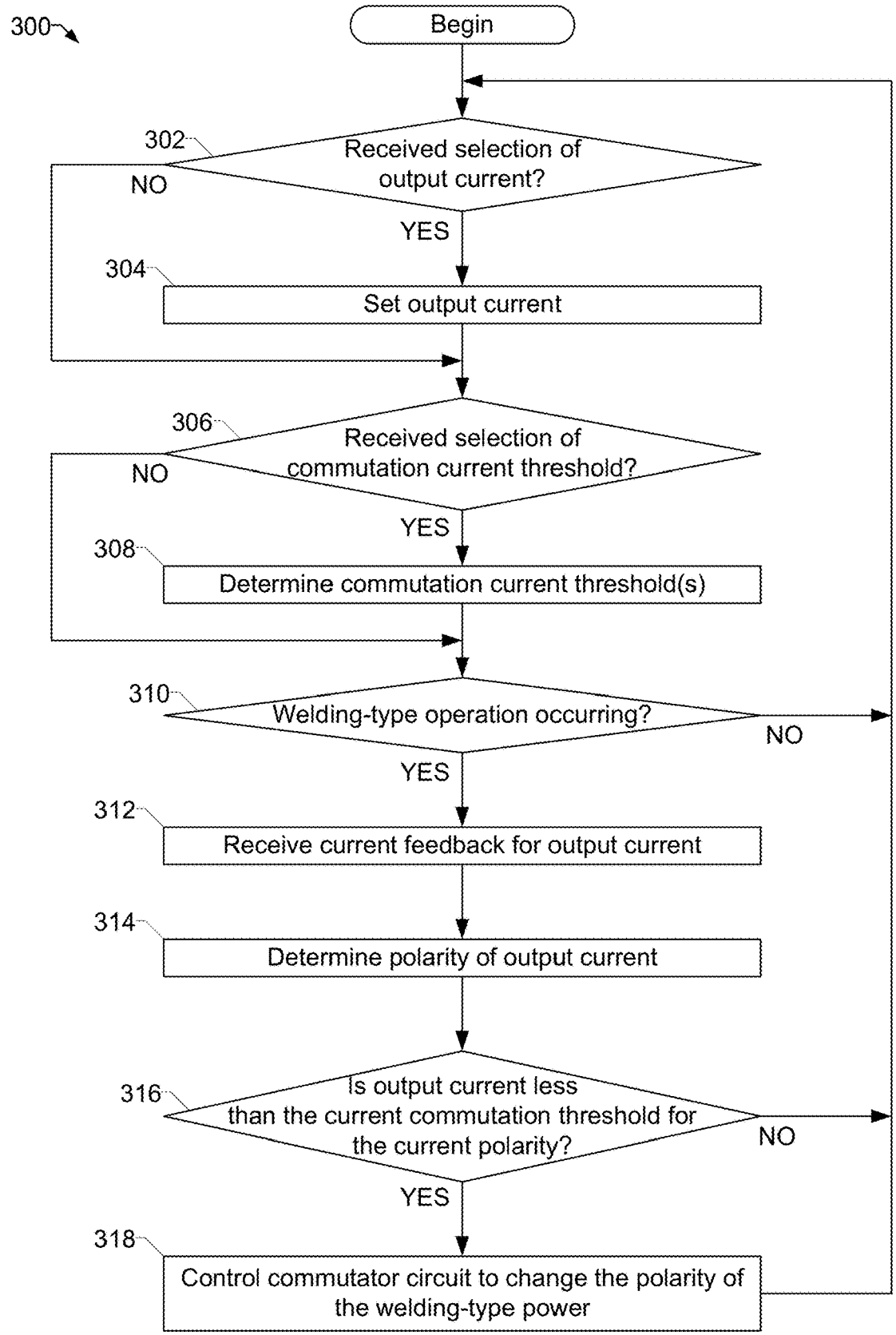
FIG. 3 is a flowchart illustrating example machine readable instructions which may be executed by the control circuit to implement the welding-type power supply of FIG. 1 to output AC welding-type power based on an adjustable current commutation threshold.

FIG. 3 is a flowchart illustrating example machine readable instructions 300 which may be executed by the control circuit 108 to implement the welding-type system 100 of FIG. 1 to output AC welding-type power based on an adjustable current commutation threshold.

At block 302, the control circuit 108 determines whether a selection of an output current has been received. For example, the control circuit 108 may receive an AC current amplitude selection via the user interface device 102 of FIG. 1. If a selection of the output current has been received (block 302), at block 304 the control circuit 108 sets the output current. For example, the control circuit 108 may set the current command 126 based on the output current selection 103.

At block 306, the control circuit 108 determines whether a selection of a commutation current threshold has been received. For example, the control circuit 108 may receive a selection or configuration of the positive current commutation threshold 204 and/or the negative current commutation threshold 206, either directly or indirectly, via the user interface device 102. If selection of a commutation current threshold has been received (block 306), at block 308 the control circuit 108 determines positive and/or negative current commutation threshold(s). For example, the control circuit 108 may calculate the negative current commutation threshold based on the direct selection of the positive current commutation threshold and one or more other factors, and/or vice versa.

At block 310, the control circuit 108 determines whether a welding-type operation is occurring. If a welding-type operation is occurring (block 310), at block 312 the control circuit 108 receives the current feedback 120 for the output current 118. For example, the control circuit 108 may read in a sample input from the ADC 124. At block 314, the control circuit determines a polarity of the output current. The polarity of the output current may be based on the current feedback 120 and/or based on tracking the value of the polarity signal 134.

At block 316, the control circuit 108 determines whether the output current 118 is less than the current commutation threshold for the current polarity. For example, if the control circuit 108 determines at block 314 that the current polarity is positive, the control circuit 108 compares the output current 118 (based on the feedback 120) to the positive current commutation threshold 204. If the output current 118 is less than the current commutation threshold for the current polarity (block 316), at block 318 the control circuit 108 controls the commutator circuit 106 (e.g., via the polarity signal 134 and the gate drive circuit 116) to change the polarity of the welding-type power.

After changing the polarity of the welding-type power (block 318), if the output current 118 is not less than the current commutation threshold for the current polarity (block 316), or if a welding-type operation is not occurring (block 310), control returns to block 302.

The present methods and systems may be realized in hardware, software, and/or a combination of hardware and software A typical combination of hardware and software may include one or more application specific integrated circuits and/or chips. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
an interface device configured to receive a commutation current threshold selection input;
a power converter configured to convert input power to welding-type power;
a commutator circuit configured to output alternating current (AC) welding-type power and to control a polarity of the AC welding-type power; and
a control circuit configured to:
set a commutation current threshold based on the commutation current threshold selection input, wherein the commutation current threshold selection input comprises a selection of a percentage of a peak current amplitude, and the control circuit is configured to determine the commutation current threshold based on multiplying the commutation current threshold selection input by a positive peak current setpoint or a negative peak current setpoint;
determine an output current of the AC welding-type power and the polarity of the AC welding-type power; and
when the output current traverses the commutation current threshold, control the commutator circuit to change the polarity of the AC welding-type power.

2. The welding-type power supply as defined in claim 1, wherein the control circuit is configured to set the commutation current threshold equal to a value received via the commutation current threshold selection input.

3. The welding-type power supply as defined in claim 1, wherein the commutation current threshold is a same value for a positive current or a negative current with respect to a reference current.

4. The welding-type power supply as defined in claim 1, wherein the commutation current threshold is a different value for a positive current or a negative current with respect to a reference current.

5. The welding-type power supply as defined in claim 1, wherein the different arc characteristics comprise characteristics of a harder or softer arc.

* * * * *